Patented Sept. 9, 1941

2,255,447

UNITED STATES PATENT OFFICE 2,255,447

MALONIC ACID DERIVATIVES

Walter Kropp, deceased, late of Wuppertal-Elberfeld, Germany, by Marie Kropp, administratrix, Wuppertal-Elberfeld, Germany, assignor to Winthrop Chemical Company, Inc., New York, N. Y., a corporation of New York No Drawing. Application March 1, 1939, Serial No. 259,106. In Germany March 4, 1938

4 Claims. (Cl. 260—485)

This invention relates to new malonic acid derivatives and to a process of manufacturing the same.

It has been found that valuable hypnotics are obtained when manufacturing sec.-butyl-alkyl-malonic acid amide-esters. The soporific effect of these compounds is an especially good one if the alkyl substituent is an ethyl group.

According to the present invention the new products are obtained from sec.-butyl-alkyl-acetic esters, containing at the α-carbon atom a group convertible into the carboxylic acid amide group, for instance, the nitrile group, a carboxylic acid halide group, carboxylic acid ester group or carboxylic acid ammonium or amine salt group. The nitril group is saponified to the carboxylic acid amide group preferably by means of a water-containing sulfuric acid which contains of a about 50 to about 95% sulfuric acid. An about 90% sulfuric acid saponifies the nitril compound within a short time on heating to 80–90° C. The carboxylic acid halide or ester group is converted into the carboxylic acid amide group by acting thereupon with ammonia, primary or secondary amines, a carboxylic acid ammonium or amine salt group is converted into the carboxylic acid amide group by splitting off water. It is also possible to start from sec.-butyl-alkyl-acetamides, containing at the α-carbon atom a group convertible into a carboxylic acid ester group, for instance a carboxylic acid group. The carboxylic group of a sec.-butyl-alkyl-malonic acid monoamide is converted into the carboxylic acid ester group in a manner known per se, for instance by means of dialkylsulfate or diazomethane.

Certain dialkylmalonic acid amide-esters have already been prepared, which preferably have been utilized as intermediate products for the manufacture of other substances. In view of the facts already known and described in connection with malonic acid amide-esters the qualification of the new sec.-butyl-alkyl-malonic acid amide esters as soporifics was not to be foreseen.

Example 1

2340 ccs. of pure concentrated sulphuric acid are mixed with 470 ccs. of ice water. 1.638 kgs. of sec.-butyl-ethyl-cyano acetic acid ethyl ester, boiling at 117–120° C. at 14 mms. pressure and having the formula

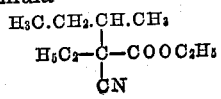

are added to this solution at a temperature of 25–30° C., and the mixture is heated on the water-bath for 3 hours. After termination of the reaction the solution is poured on to ice and extracted with ether. The ethereal solution is shaken thoroughly with dilute ammonia and later on with water. The sec.-butyl-ethyl-malonic acid amide ethyl ester is obtained as solid residue after drying of the ethereal solution and evaporating of the ether. For purification purposes the ester may be dissolved in acetic ester and precipitated with petroleum ether or redissolved from ligroin. The ester distils at 127–130° C. under 3 mms. pressure. It melts at 73–74° C. It is difficultly soluble in water but readily soluble in the most organic solvents.

In an analogous manner the sec.-butyl-(n-propyl)-malonic acid amide ethyl ester can be prepared. Redissolved from ligroin it melts at 66–67° C.

Example 2

6 grs. of sec.-butyl-ethyl-malonic acid monoamide, melting at 109° C., are dissolved in 33 ccs. of normal sodium hydroxide solution and shaken thoroughly with 6 grs. of dimethyl sulfate while cold; thereupon the solution is mixed again with 33 ccs. of normal sodium hydroxide solution. The oil is extracted with ether, the ethereal solution again shaken with dilute ammonia solution and washed with water. After drying of the solution the ether is evaporated. The residue being at first oily solidifies soon. After redissolution from ether and petroleum ether the sec.-butyl-ethyl-malonic acid amide methyl ester melts at 52° C.

Instead of dimethyl sulfate other alkylating agents may be used for the esterification, as for instance diazomethane; one may also start from the optically active forms of the sec.-butyl-alkyl-malonic acid-mono-amides.

What is claimed is:
1. A secondary-butyl-lower alkyl-malonic acid-mono-amide-lower alkyl ester.
2. A secondary-butyl-ethyl-malonic acid-mono-amide-lower alkyl ester.
3. A secondary butyl-ethyl-malonic acid-mono-amide ethyl ester.
4. A secondary-butyl-ethyl-malonic acid-mono-amide methyl ester.

MARIE KROPP.
*Administratrix of the Estate of Walter Kropp, Deceased.*